United States Patent Office 3,573,033
Patented Mar. 30, 1971

3,573,033
PROCESSES OF DIRECT REDUCTION OF MINERALS
Jean Bouchet, Clery-Saint-Andre, Loiret, France, assignor to Societe Metallurgique d'Imphy, Paris, France
No Drawing. Continuation of application Ser. No. 511,991, Dec. 6, 1965. This application Feb. 27, 1969, Ser. No. 804,378
Claims priority, application France, Dec. 16, 1964, 998,852
Int. Cl. C21b 13/00
U.S. Cl. 75—33
5 Claims

ABSTRACT OF THE DISCLOSURE

Direct reduction of ores which are difficult to reduce is started at the equilibrium temperature by adding to the charge of the ore, reducing agents and slag forming materials heated to the equilibrium temperature a supplemental charge containing the metal of the mineral in pulverized state.

---

This is a continuation of application Ser. No. 511,991, filed Dec. 6, 1965, now abandoned.

This invention relates to the direct reduction of ores which are difficult to reduce, e.g. iron, chromium or manganese ores. The term ores in this context means either the natural products or oxide-containing products.

For the direct reduction of these ores, a charge is made up of a mixture of ores and a reducing agent, e.g. carbon.

When this mixture is heated reduction takes place, but it has been found that the reduction time is relatively long or else the reduction takes a long time to start.

The present invention relates to a method of accelerating the reduction kinetics.

According to the invention, when the charge has reached a temperature level at which reduction is possible and at which the reducing agent dissolves in the metal, an additional powdered charge in which the metal phase is present is introduced into the main charge.

The reason for this is that it has been found that it is very advantageous to introduce a quantity of powdered metal or ore which has already undergone prereduction such that the metal phase is present in the powdered state, into the main charge when the latter is at an adequate temperature.

For the reduction of iron ores, the additional charge of powdered iron ore or prereduced ore is introduced when the temperature reaches the austenitic range, i.e. at least 725° C.

The proportion of iron to be added to the main charge need not be very large, a few percent by weight is sufficient, e.g. 1 to 2%.

The metal particles added immediately act like seeds, and then a reduction progresses rapidly.

It is probable that the added metal grains become cemented in the carburised reducing agent and that the resultant nascent carbon more readily reduces the neighbouring ore particles thus resulting in new particles of metal.

A very suitable grain size for the additional charge particles is for the particles to have a mean diameter of one-tenth of a millimeter, the smallest particles having four-hundredths of a millimeter and the largest a half-a millimeter.

In reduction of ores for the production of ferro-chromium and ferro-manganese it is possible, as in the case of the reduction of iron ores, to use an iron powder having the above grain size for example. The reaction then begins by the reduction of the iron oxides and then continues with the other oxides.

For the reduction of ores in which the metal is not iron, the added powder is of course either a powder of the metal whose ore it is required to reduce or an ore containing this metal in the powdered form, the grain size being the same as indicated hereinbefore.

Irrespective of the ore for reduction, the additional charge may be formed by compacted powder if the powder available is too fine and is likely to be entrained by the fumes, in which case compaction of the powder can bring the grain size to an average diameter of about a tenth of a millimeter.

When the ore for reduction is not an iron oxide, the temperature at which the additional charge must be introduced will depend on thermochemical considerations, which will indicate the temperature at which reduction by the carbon is possible. Also, at this temperature the carbon must be able to dissolve in the metal. This temperature may be of the order of 600° C. in the case of manganese and 900° C. in the case of chromium.

Of course the invention is not limited to the above details of performance of the method, which can be modified without departing from the scope of the invention.

I claim:
1. In a process for accelerating the direct reduction of minerals difficult to reduce such as the minerals of iron, chromium and manganese in which a principal charge of a mixture of the mineral and of a solid reducing agent is heated in a furnace, the step of adding a pulverized supplementary charge of the metal of the mineral in elemental state to the principal charge at the moment when the principal charge reaches a temperature at which reduction is possible and at which solution of the reducing agent in the metal occurs.

2. A process as described in claim 1, the charge containing an iron oxide and the supplementary charge being introduced into the main charge at a temperature corresponding to the austenitic range of at least 725° C.

3. A process as described in claim 1, the additional charge being a powdered metal.

4. A process as described in claim 1, the supplemental charge being a prereduced ore in which the metal is present in the powdered state.

5. A process as described in claim 1, the pulverized supplementary charge being one to two percent by weight of the principal charge.

References Cited

UNITED STATES PATENTS
3,494,761    2/1970    Gravenor.

I. DEWAYNE RUTLEDGE, Primary Examiner
J. M. DAVIS, Assistant Examiner

U.S. Cl. X.R.
75—.5, 80, 84